F. H. CRINER.
MOLD.
APPLICATION FILED SEPT. 26, 1921.

1,437,725.

Patented Dec. 5, 1922.

INVENTOR.
Fred H. Criner
BY
*Richey, Slough and Fales*
ATTORNEY.

Patented Dec. 5, 1922.

1,437,725

UNITED STATES PATENT OFFICE.

FRED H. CRINER, OF SEVILLE, OHIO.

MOLD.

Application filed September 26, 1921. Serial No. 503,150.

*To all whom it may concern:*

Be it known that I, FRED H. CRINER, a citizen of the United States, residing in Seville, Ohio, whose post-office address is care of The Seville Porcelain Company, Seville, Ohio, have invented certain new and useful Improvements in Molds; and I do hereby declare the following to be a full, clear, concise, and exact description of the invention, such as will enable others skilled in the art to which it appertains to make and use the same.

Heretofore molds of this character have been held in upright position by placing them on upright pegs which pegs have been allowed to come in direct contact with the mold itself. The result has been that such molds have been frequently broken. My invention contemplates an improved arrangement that interposes a socket between the mold and the peg.

Among the objects of my invention are:

To provide a mold for use in making rubber gloves and the like with an improved socket terminal through the medium of which the mold can be held in standing position and removed from the stand readily without danger of breaking;

To provide details of improvement tending to increase the efficiency and serviceability of a device of the above character.

To accomplish the foregoing and other useful ends my invention comprises means hereinafter more fully set forth and claimed.

Referring to the accompanying drawing.

Figure 1:
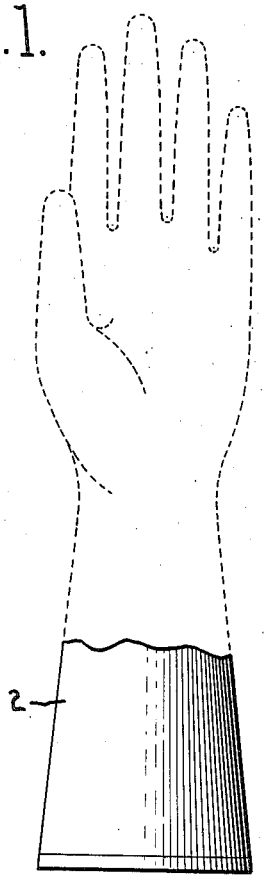
Fig. 1 shows the mold and socket in elevation.
Figure 3:
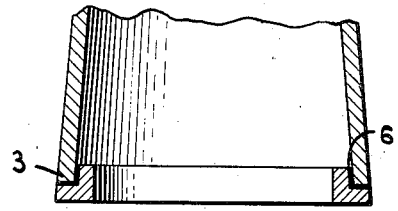
Fig. 3 is a section thereof on line 3—3.
Figure 4:
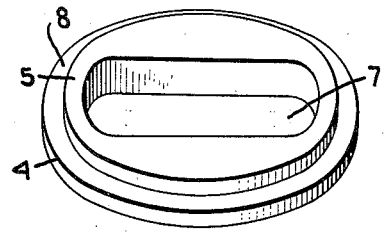
Fig. 4 is a perspective of the socket Fig. 2.
Figure 2:
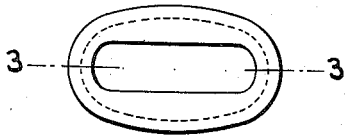
Fig. 2 is a bottom view of the socket section.

Referring more in detail to the figures, the form 2 is usually made of porcelain. The mold, 2, terminates in its lower end, 3, in an opening. As a socket for this mold I provide a terminal piece or heel, 4, Fig. 4 having a flange, 5, that projects into the mold itself as shown in Fig. 3, and having also a rim section, 8, adapted to be located in juxtaposition to the lower or rim terminal of the form, 2, the terminal piece being fitted into position as shown in Fig. 3 is cemented to the mold itself by the use of any suitable cement, 6. A device constructed in this manner may be held in position by having a fiber or other suitable plug projecting upward on the table over which plug the mold may be placed by slipping the aperture, 7, over the plug thus holding the mold in an upright position as indicated in Fig. 1.

Assuming that the mold is used for the purpose of making rubber gloves, after the rubber has been deposited on the mold and is in condition to be removed from the form, the form can of course be readily lifted from the pegs and the glove removed from the form. This terminal piece, 4, I plan to make of porcelain although other material may be used provided it is subject to being cemented to the form as described.

It will be understood, of course, that if I wish I may use a type of cement between the socket and the mold proper such as to enable me to treat the same in an oven and have a continuous enamel surface extending down to and joining with the socket.

What I claim as my invention is:—

1. In combination with a molding form having a hollowed tube-like terminal, a heel socket therefor consisting of a disk having a flange projecting into the hollow terminal and cement means for securing the heel to the form.

2. In combination with a molding form having a hollowed tube-like terminal, a heel socket therefor consisting of a disk having a flange projecting into the said hollow terminal, the external dimensions of the said disk corresponding with the external dimensions of the said terminal, and the side surfaces of the said flange being of suitable dimensions to lie closely adjacent the inner surfaces of the said terminal whereby the said disk and flange may be secured to the said form.

3. In combination with a molding form having a hollowed tube-like terminal, a heel socket therefor consisting of a disk adapted to engage the said terminal, a flange upstanding from the said disk and adapted to project into the said terminal, the outer surface of the said flange lying adjacent the inner surface of the said terminal, an aperture extending through the said disk and flange, and means for securing the disk to the said molding form.

4. As a new article of manufacture, a molding form for rubber goods, composed of porcelain or like material, having a hollow terminal portion and a reinforcing socket adapted to strengthen the said hollow terminal portion, the said socket being formed to seat on the open end edge of the said hollow terminal portion and to be secured to the said portion.

In witness whereof, I have hereunto signed my name this 19th day of September, 1921.

FRED H. CRINER.